United States Patent
Longo

(10) Patent No.: US 12,426,610 B2
(45) Date of Patent: Sep. 30, 2025

(54) DISPENSING GROUP FOR A MACHINE FOR DISPENSING FOODSTUFF CREAMS

(71) Applicant: SOREMARTEC S.A., Senningerberg (LU)

(72) Inventor: Marco Longo, Bra (IT)

(73) Assignee: SOREMARTEC S.A., Senningerberg (LU)

( * ) Notice: Subject to any disclaimer, the term of this patent is extended or adjusted under 35 U.S.C. 154(b) by 365 days.

(21) Appl. No.: 17/610,313

(22) PCT Filed: May 13, 2020

(86) PCT No.: PCT/IB2020/054527
§ 371 (c)(1),
(2) Date: Nov. 10, 2021

(87) PCT Pub. No.: WO2020/230049
PCT Pub. Date: Nov. 19, 2020

(65) Prior Publication Data
US 2022/0240536 A1    Aug. 4, 2022

(30) Foreign Application Priority Data

May 14, 2019    (IT) .......................... 102019000006833

(51) Int. Cl.
*A23G 3/02*    (2006.01)
*A23G 3/34*    (2006.01)

(52) U.S. Cl.
CPC ............ *A23G 3/021* (2013.01); *A23G 3/0008* (2013.01)

(58) Field of Classification Search
CPC ...... A23G 3/021; A23G 3/0008; F16K 23/00; F16K 21/04; F16K 15/14–1401;
(Continued)

(56) References Cited

U.S. PATENT DOCUMENTS 261,694 A * 7/1882 Evenden .............. B65D 47/263
222/484
1,542,584 A * 6/1925 Rose .................... A47K 5/1209
222/207
(Continued)

FOREIGN PATENT DOCUMENTS

CN    108778521 A    11/2018
DE    29905283 U1    6/1999
(Continued)

OTHER PUBLICATIONS

International Search Report and Written Opinion issued for International Application No. PCT/IB2020/054527 on Aug. 7, 2020, 11 pages.

(Continued)

*Primary Examiner* — Paul R Durand
*Assistant Examiner* — Randall A Gruby
(74) *Attorney, Agent, or Firm* — ROTHWELL, FIGG, ERNST & MANBECK, P.C.

(57) ABSTRACT

Described herein is a dispensing assembly (10) for a machine (M) for dispensing cream food products.
The assembly is characterized in that it comprises:
- a duct unit (2) having a generic tubular shape so as to define a passage for a cream to be dispensed and defining a section for inlet (2A) and a section for dispensing (2B) of the cream; and
- a first valve (4) and a second valve (6), each constituted by a diaphragm that can be opened under pressure, which are set inside said unit (2) at said dispensing section (2B) and are set at a distance apart from one another so as to identify a chamber (C) between them.

6 Claims, 2 Drawing Sheets

(58) Field of Classification Search
CPC ........ F16K 15/144–1441; F16K 15/147–1472; F16K 15/1481; Y10T 137/7838; Y10T 137/7841; Y10T 137/7846
See application file for complete search history.

(56) References Cited

U.S. PATENT DOCUMENTS

| | | | | |
|---|---|---|---|---|
| 2,322,631 | A * | 6/1943 | Groeniger | E03C 1/106 137/218 |
| 2,413,916 | A * | 1/1947 | Hallead | B67C 3/26 141/117 |
| 2,670,757 | A * | 3/1954 | Delany | F16K 15/147 137/515 |
| 2,772,817 | A * | 12/1956 | Jauch | F04B 43/08 55/432 |
| 3,160,329 | A * | 12/1964 | Radic | A45D 40/00 137/859 |
| 3,220,611 | A * | 11/1965 | Zander | A47K 5/1208 222/105 |
| 3,365,240 | A * | 1/1968 | Gordon | B65G 53/4675 222/373 |
| 3,485,419 | A * | 12/1969 | Taylor | G01F 11/025 222/340 |
| 3,661,167 | A * | 5/1972 | Hussey | F16K 15/042 137/533.15 |
| 3,902,516 | A * | 9/1975 | Rudolph | F16K 11/105 137/515.7 |
| 4,139,469 | A * | 2/1979 | Rainin | B01D 15/166 210/136 |
| 4,232,704 | A * | 11/1980 | Becker | E03C 1/106 137/512 |
| 4,256,242 | A * | 3/1981 | Christine | G01F 11/088 222/207 |
| 4,334,640 | A * | 6/1982 | van Overbruggen | G01F 11/086 251/5 |
| 4,515,294 | A * | 5/1985 | Udall | B65D 77/065 222/105 |
| 4,570,829 | A * | 2/1986 | Allen | B65D 35/40 222/207 |
| 4,607,764 | A * | 8/1986 | Christine | G01F 11/088 222/491 |
| 4,646,945 | A * | 3/1987 | Steiner | G01F 11/088 222/215 |
| 4,776,495 | A * | 10/1988 | Vignot | A47K 5/1209 222/206 |
| 4,846,218 | A * | 7/1989 | Upchurch | G01N 30/32 137/550 |
| 4,862,907 | A * | 9/1989 | Ledtje | F16K 15/042 251/368 |
| 4,945,945 | A * | 8/1990 | Schmid | F16K 15/042 137/533.15 |
| 5,082,150 | A * | 1/1992 | Steiner | A47K 5/1209 222/189.09 |
| 5,105,997 | A * | 4/1992 | Wakabayashi | F16K 15/147 239/DIG. 12 |
| 5,501,372 | A * | 3/1996 | Daansen | A47K 5/1207 222/207 |
| 5,553,740 | A * | 9/1996 | King | B67D 7/0255 222/88 |
| 5,597,093 | A * | 1/1997 | Lee | G01F 11/088 222/146.6 |
| 5,857,595 | A * | 1/1999 | Nilson | B05B 11/1067 222/212 |
| 5,887,762 | A * | 3/1999 | Hanna | B67D 7/0205 222/320 |
| 5,938,086 | A * | 8/1999 | Gross | B65D 47/2031 222/506 |
| 6,089,260 | A * | 7/2000 | Jaworski | F16K 15/147 137/846 |
| 6,092,695 | A * | 7/2000 | Loeffler | B01L 3/0296 137/859 |
| 6,112,952 | A * | 9/2000 | Hess, III | B65D 47/2062 137/849 |
| 6,131,766 | A * | 10/2000 | King | B67D 7/0216 222/326 |
| 6,415,961 | B2 * | 7/2002 | Bonningue | G01F 11/16 222/207 |
| 6,814,262 | B1 * | 11/2004 | Adams | A23G 9/283 417/478 |
| 7,004,356 | B1 * | 2/2006 | Sayers | B05B 7/0037 222/137 |
| 7,331,360 | B2 * | 2/2008 | Camis, Jr. | F16K 27/0209 137/512.3 |
| 7,501,283 | B2 * | 3/2009 | Hersch | G01F 11/021 422/562 |
| 7,651,010 | B2 * | 1/2010 | Orzech | F04B 43/082 417/474 |
| 7,718,435 | B1 * | 5/2010 | Bogen | B67D 7/0216 422/67 |
| 7,748,407 | B2 * | 7/2010 | Colby | F41B 11/724 222/3 |
| 8,113,239 | B2 * | 2/2012 | Richards | B67D 3/044 222/511 |
| 8,360,285 | B2 * | 1/2013 | Grbesic | A47K 5/1208 222/207 |
| 8,528,792 | B2 * | 9/2013 | Ophardt | B05B 11/1097 222/321.6 |
| 8,752,732 | B2 * | 6/2014 | Evans | F04B 43/08 222/207 |
| 8,899,449 | B2 * | 12/2014 | Daansen | F16K 47/08 222/212 |
| 9,016,526 | B2 * | 4/2015 | Evans | F04B 43/08 222/207 |
| 9,199,834 | B2 * | 12/2015 | Drennow | B67D 7/36 |
| 9,266,134 | B2 * | 2/2016 | Wells | B05B 11/1069 |
| 9,353,742 | B2 * | 5/2016 | Herman | F04B 53/10 |
| 9,469,464 | B2 * | 10/2016 | Boehm | B01L 3/502738 |
| 9,587,655 | B2 * | 3/2017 | Ophardt | B05B 11/007 |
| 10,293,355 | B2 * | 5/2019 | Barron | B05B 11/0072 |
| 11,002,260 | B2 * | 5/2021 | Chang | B05B 11/0062 |
| 11,820,546 | B2 * | 11/2023 | Pozzi | B65D 47/18 |
| 2004/0191128 | A1 * | 9/2004 | Bogen | F04B 53/107 422/400 |
| 2006/0049208 | A1 * | 3/2006 | Daansen | B65D 47/2031 222/212 |
| 2011/0315024 | A1 * | 12/2011 | Ouriev | A23G 3/0257 137/511 |
| 2020/0238312 | A1 | 7/2020 | Santagiuliana | |
| 2022/0240536 | A1 * | 8/2022 | Longo | A23G 3/021 |

FOREIGN PATENT DOCUMENTS

| | | |
|---|---|---|
| EP | 0610724 A2 | 8/1994 |
| FR | 674284 A | 1/1930 |
| GB | 956933 A | 4/1964 |

OTHER PUBLICATIONS

Chinese Office Action issued for Chinese Patent Application No. 2020800354442 on May 27, 2023, 12 pages.
Search Report issued for Italian Patent Application No. 201900006833 on Jan. 28, 2020, 7 pages.
Examination Report issued for Indian Patent Application No. 202147051641 on Jun. 2, 2023, 6 pages.

* cited by examiner

DISPENSING GROUP FOR A MACHINE FOR DISPENSING FOODSTUFF CREAMS

CROSS REFERENCE TO RELATED APPLICATION(S)

This application is a 35 U.S.C. 371 National Phase Entry Application from PCT/IB2020/054527 filed May 13, 2020, which claims priority to Italian Application No. 102019000006833, filed May 14, 2019. The entirety of the disclosures of the above-referenced applications are incorporated herein by reference.

The present invention relates to a dispensing assembly for a machine for dispensing cream food products.

The assembly in question is pre-arranged for being connected to an outlet duct of the dispensing machine, and defines the outflow section through which the cream fed by the machine is dispensed.

The dispensing machines referred to above are prevalently used in businesses or outlets such as bars, cake-shops, restaurants, etc., affording the advantage of facilitating dispensing of the cream and moreover guaranteeing conservation thereof according to pre-set modalities (for example, at a temperature of conservation higher than room temperature).

The dispensing assembly described herein has been designed in order to prevent any possible dripping of the cream once dispensing is completed.

The dispensing assembly described herein is defined by the characteristics specified in claim 1.

The claims form an integral part of the technical teaching provided herein in relation to the invention.

Further characteristics and advantages of the invention will emerge clearly from the ensuing description with reference to the annexed drawings, which are provided purely by way of non-limiting example and in which.

In the ensuing description, various specific details are illustrated aimed at providing an in-depth understanding of the embodiments. The embodiments may be obtained without one or more of the specific details, or with other methods, components, materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated above, the dispensing assembly described herein is designed to be used in a machine for dispensing cream food products.

Figure 1:
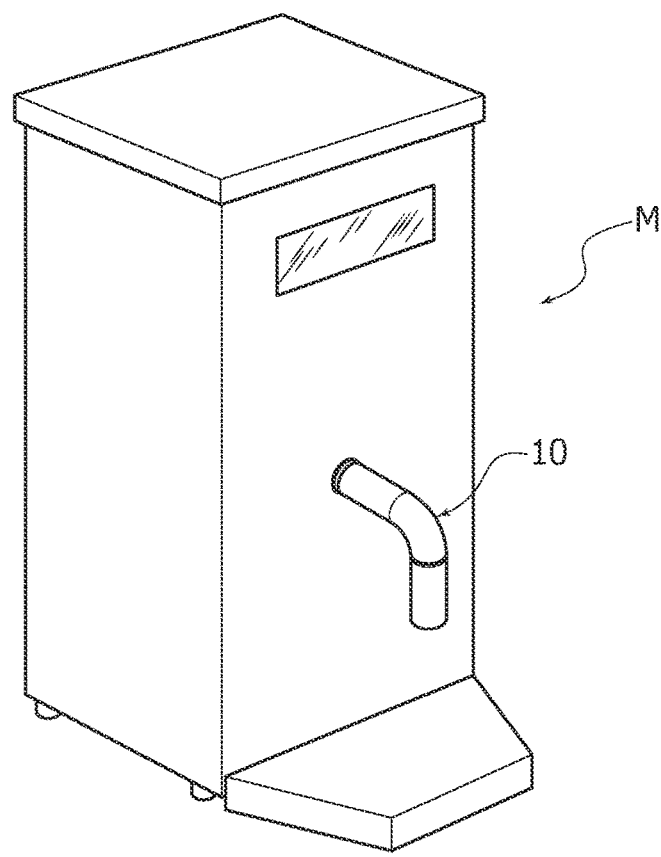
FIG. 1 represents the dispensing assembly described herein, according to a preferred embodiment thereof, mounted on a dispensing machine.
Figure 2:
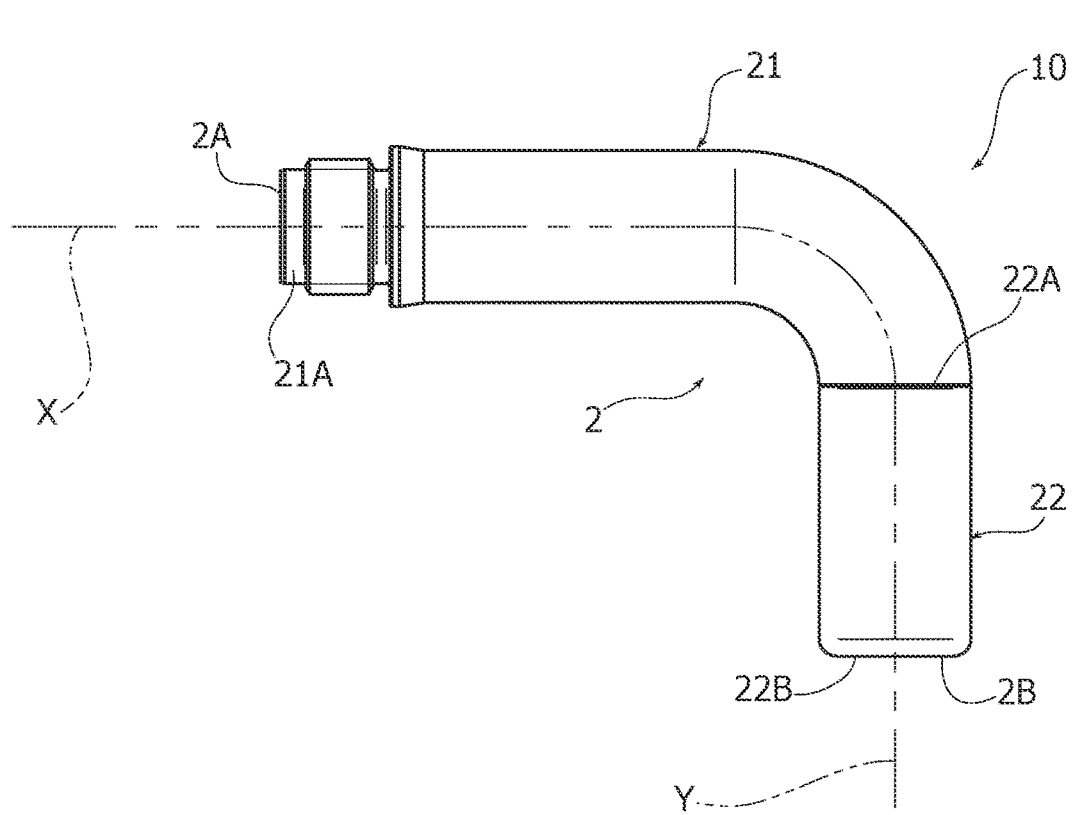
FIG. 2 is a side view of the dispensing assembly of FIG. 1.
Figure 3:
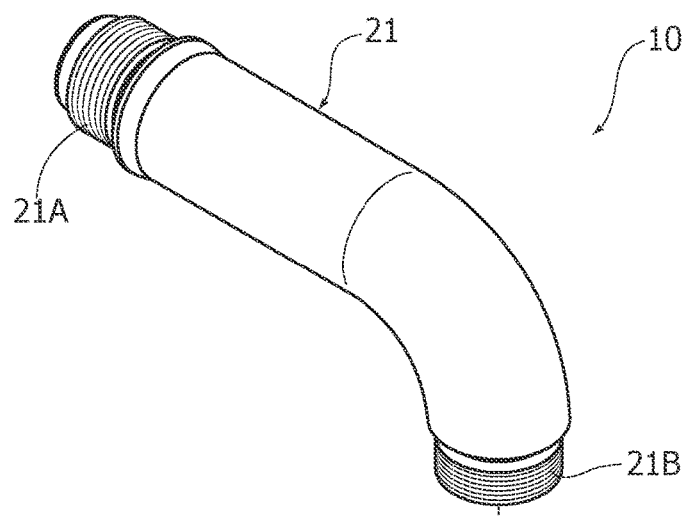
FIG. 3 is an exploded view of the assembly of FIG. 1.
Figure 4:
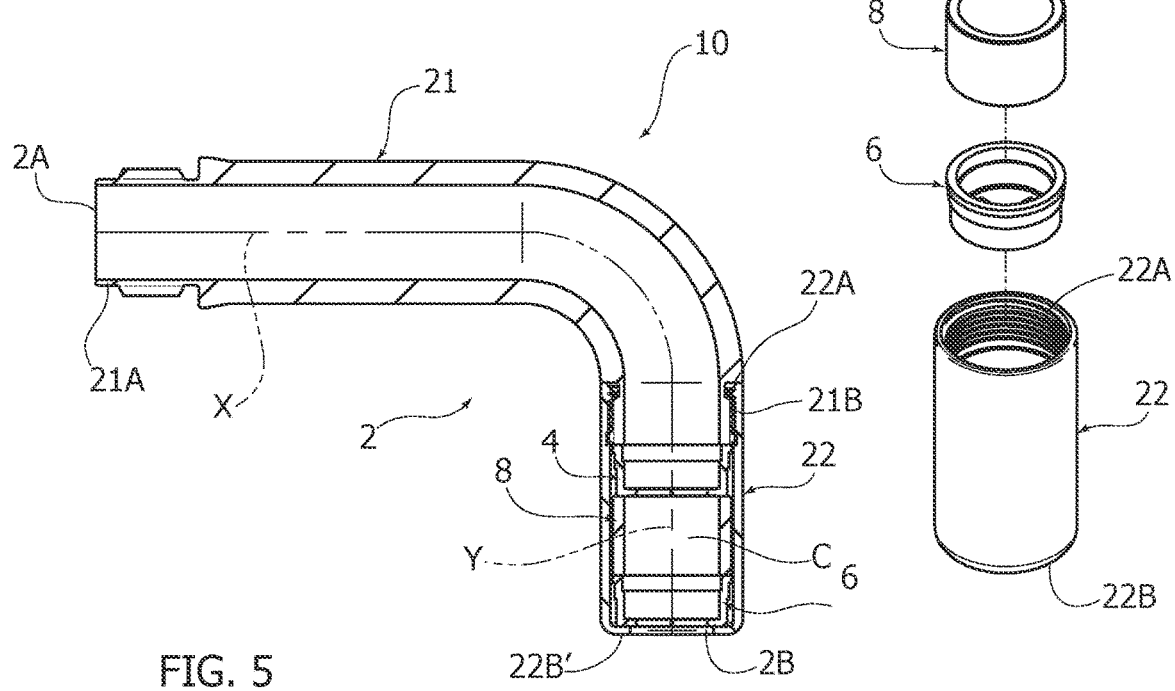
FIG. 4 is a cross-sectional view of the assembly of FIG. 1.

Purely by way of illustration, FIG. 1 represents a generic dispensing machine M mounted on which is the dispensing assembly described herein, designated as a whole by the reference number 10.

In general, machines of this type comprise a tank containing the cream food product, and a feed system that is constituted by a ducting, for carrying the cream taken from the tank, and by a pressure-generating device, for example a pump, designed to generate within the aforesaid ducting a flow of cream under pressure.

The ducting referred to identifies an outlet duct (or outlet portion) associated to which are the means for dispensing the cream.

The dispensing assembly 10 is designed to be connected to the above outlet duct of the generic dispensing machine M.

The assembly 10 comprises a duct unit 2 that constitutes a pipe or duct for passage of the cream to be dispensed.

In general, the unit 2 has a tubular shape, and defines a section 2A for inlet of the cream and a section 2B for dispensing of the cream.

For the reasons that will become evident in what follows, the unit 2 is formed by two tubular bodies 21, 22, which can be connected together at the respective ends 21B, 22A. Preferably, the two ends 21B, 22A are provided with fast-connection means, such as screw means, slotting means, bayonet-coupling means, etc.

In various preferred embodiments, as in the one illustrated, the two ends 21B, 22A have two complementary cylindrical shapes, provided with internal and external threads T for being screwed together.

The end 21A of the body 21, opposite to the end 21B, is, instead, prearranged for being connected to the aforesaid outlet duct of the dispensing machine M. Also in this case, preferably, the end 21A is equipped with fast-connection means. In various preferred embodiments, as in the one illustrated, the end 21A is provided with an external thread or an internal thread T. The same end defines the inlet section 2A of the unit 2.

In the example illustrated, the duct unit 2 has a bent profile so that the geometrical axis Y identified by the dispensing section 2B (the axis Y is the axis orthogonal to the dispensing section 2B) is transverse or orthogonal to the geometrical axis X defined by the inlet section 2A.

In various preferred embodiments, as in the one illustrated, the body 21 has a curved portion to define the bent configuration, referred to above, of the unit 2, whereas the body 22 is substantially rectilinear, extending along the axis Y.

The assembly 10 further comprises a pair of valves 4, 6, which are housed within the body 22, set at a distance apart from one another along the axis Y.

The two valves 4 and 6 are each constituted by a diaphragm, made of elastomeric material, which can be opened under pressure.

Figure 5:
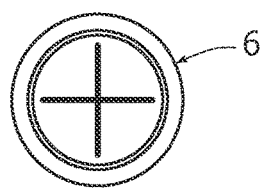
FIG. 5 is a front view of a component of the assembly of FIG. 1.

In a way in itself known, each of the two valves 4 and 6 is prearranged to form an opening for passage of the cream, when they are subjected, on the upstream side, to a given pressure, higher than or equal to a pre-set value. By way of example, the diaphragm that constitutes these valves may have one or more cuts that identify leaflets that can undergo elastic deformation, when they are subjected to the aforesaid pressure, separating from one another and thus creating a passage for the cream through the diaphragm. FIG. 5 illustrates a front view of one of the two valves 4 and 6; in the example shown, the diaphragm of these valves has a cut having the shape of a cross, which identifies four leaflets. Once again by way of example, for the valves 4 and 6 in question the valves marketed by the companies Bericap and APTAR may be used.

Preferably, the end 22B of the body 22, opposite to the end 22A, has an edge 22B' bent inwards in the same plane as the one defined by the dispensing section 2B, on which the valve 6 comes to rest. In addition, a retention ring or washer may be provided.

In various preferred embodiments, as in the one illustrated, the assembly 10 comprises a spacer element 8, preferably having a tubular shape, even more preferably a cross section with circular profile, which is set between the valves 4 and 6, and on which the top valve 4 rests directly.

In view of the foregoing, the edge 22B' bent inwards supports and holds in position the ensemble formed by the two valves 4 and 6 and by the spacer element 8.

Between the two valves 4 and 6 there is hence identified a chamber C, which is immediately adjacent to the dispensing section 2B of the unit 2, and is separate from the remaining portion of the passage for the cream defined by the unit 2.

With reference now to operation of the assembly 10 described, dispensing of the cream is started under the impulse of a flow of cream under pressure that is fed by the dispensing machine M. The pressure of the flow of cream causes the valves 4 and 6 to open, and the cream can hence come out through the dispensing section 2B.

Dispensing continues as long as the aforesaid flow of cream under pressure is fed by the dispensing machine M.

At the moment when the pressure-generating device of the machine M is deactivated, the two valves 4 and 6 close, and the cream in the proximity of the dispensing section 2B remains trapped within the chamber C.

The present applicant has found that the two valves 4 and and the chamber C provided between them, guarantee the absence of dripping of the cream at the end of the dispensing step.

The machine M may be configured so that the pressure-generating device generates in the ducts of the machine and in the duct unit 2 a pressure of opposite sign with respect to the one generated for delivery of the cream, as soon as the dispensing step is completed, so as to determine a suction effect. This action favours sudden closing of the two valves 4 and 6.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

For instance, the duct unit 2 may be constituted by a single tubular body that houses inside it the two valves 4 and 6.

The invention claimed is:

1. An apparatus comprising a dispensing assembly (10) for a dispensing machine (M) for dispensing cream food products and the dispensing machine (M) for dispensing cream food products, the dispensing assembly (10) coupled to the dispensing machine (M), wherein the dispensing machine (M) comprises a pump for generating pressure, and wherein the dispensing assembly (10) comprises:
 a duct unit (2) having a tubular shape so as to define a passage for a cream to be dispensed and defining an inlet section for inlet (2A) and a dispensing section for dispensing (2B) of the cream;
 wherein said duct unit (2) is equipped with a portion (21A) for connection of said duct unit (2) to an outlet duct of said dispensing machine (M) to which a flow of cream under pressure is fed by the pump of said dispensing machine; and
 a first valve (4) and a second valve (6), each constituted by a diaphragm openable under pressure, which are set inside said unit at said dispensing section (2B) so as to interrupt dispensing of said cream through said dispensing section (2B) when said first and second valves (4, 6) are in a closed condition;
 wherein said first and second valves (4, 6) are set at a distance from one another and aligned along a longitudinal axis of said dispensing section, thus forming between them a chamber (C), which forms part of said passage defined by said duct unit (2), said chamber being separated from a remaining part of said passage when said first and second valves (4, 6) are in a closed condition so that, in operation, inside said chamber (C) part of a cream contained in said duct unit is withheld and separated when said first and second valves (4, 6) pass from an open condition to a closed condition;
 wherein said portion of said duct unit is a first end (21A), defining said inlet section (2A), and said duct unit further has a second end, defining said dispensing section (2B),
 wherein said first end (21A) is connectable at said portion for connection to said outlet duct of said dispensing machine (M), and
 wherein said first and second valves (4, 6) are positioned closer to said second end (22B) than said first end,
 said assembly comprising a spacer element (8), set between said first and second valves (4, 6), which keeps said first and second valves (4, 6) separated and at a distance from one another.

2. The assembly according to claim 1, wherein said second end (22B) comprises an edge bent inwards (22B) that supports an ensemble constituted by said first and second valves (4, 6) and said spacer element (8).

3. The assembly according to claim 1, wherein said duct unit (2) is formed by a first tubular body (21) and a second tubular body (22) connected together at respective ends (21B, 22A).

4. A method for dispensing a cream food product by means of a dispensing machine (M), which comprise a pressure-generating device and is provided with a dispensing assembly (10) according to claim 1, said method comprising the steps of:
 generating, by means of said device, a pressure in order to determine a flow of cream such as to bring said first and second valves (4, 6) of said dispensing assembly (10) into an open condition;
 dispensing a selected amount of cream through the dispensing section (2B) of said dispensing assembly (10); and
 generating, by means of said device, a pressure of opposite sign to bring about sudden closing of said first and second valves (4, 6) of said dispensing assembly (10).

5. The assembly according to claim 1, wherein the second valve comes in contact with said second end.

6. The assembly according to claim 1, wherein the first valve and the second valve are configured to both be in the open condition when subjected to a first pressure higher than a pressure threshold and are configured to both be in the closed condition when subjected to a second pressure lower than the pressure threshold.

* * * * *